United States Patent
Yamamoto et al.

(10) Patent No.: US 9,048,973 B2
(45) Date of Patent: Jun. 2, 2015

(54) BASE STATION DEVICE

(75) Inventors: Takashi Yamamoto, Osaka (JP); Yoji Okada, Osaka (JP); Yoshizo Tanaka, Osaka (JP)

(73) Assignee: SUMITOMO ELETRIC INDUSTRIES, LTD., Osaka-shi, Osaka (JP)

( * ) Notice: Subject to any disclaimer, the term of this patent is extended or adjusted under 35 U.S.C. 154(b) by 321 days.

(21) Appl. No.: 13/634,928

(22) PCT Filed: Jan. 27, 2011

(86) PCT No.: PCT/JP2011/051596
§ 371 (c)(1),
(2), (4) Date: Sep. 14, 2012

(87) PCT Pub. No.: WO2011/118251
PCT Pub. Date: Sep. 29, 2011

(65) Prior Publication Data
US 2013/0017859 A1   Jan. 17, 2013

(30) Foreign Application Priority Data
Mar. 24, 2010 (JP) ................. 2010-067666

(51) Int. Cl.
*H04W 52/04* (2009.01)
*H04J 11/00* (2006.01)
(Continued)

(52) U.S. Cl.
CPC .......... *H04J 11/0056* (2013.01); *H04W 16/16* (2013.01); *H04W 28/04* (2013.01); *H04W 52/143* (2013.01); *H04W 52/243* (2013.01); *H04W 84/045* (2013.01); *H04W 88/08* (2013.01);
(Continued)

(58) Field of Classification Search
CPC .......................... H04W 52/143; H04W 72/042
USPC ............ 455/522, 69, 452.1, 509, 67.11, 524, 455/561; 370/277, 311, 328
See application file for complete search history.

(56) References Cited

U.S. PATENT DOCUMENTS 7,653,409 B2 *   1/2010   Inaba ........................... 455/522
2005/0254555 A1   11/2005  Teague
(Continued)

FOREIGN PATENT DOCUMENTS

JP   11-252634      9/1999
JP   2007-538462    12/2007

OTHER PUBLICATIONS

Nobuyoshi Kikuma, "Adaptive Signal Processing Using Array Antenna," Kagaku Gijyutsu Shuppan, Nov. 25, 1998, pp. 1-347, including concise explanation of relevance.

(Continued)

*Primary Examiner* — John J Lee
(74) *Attorney, Agent, or Firm* — Drinker Biddle & Reath LLP

(57) ABSTRACT

A base station device performs switching of its transmission power distribution in accordance with a transmission power distribution switching timing of another base station device. The base station device includes a control unit 22 that controls transmission power distribution in the frequency domain, and a detection unit 23 that detects a switching timing at which another base station device switches transmission power distribution. The control unit 22 changes its transmission power distribution at a power distribution switching timing in the another base station device or a timing near the switching timing. Accordingly, inter-cell interference is prevented.

13 Claims, 11 Drawing Sheets

(51) Int. Cl.
  *H04W 52/24* (2009.01)
  *H04W 52/34* (2009.01)
  *H04W 16/16* (2009.01)
  *H04W 28/04* (2009.01)
  *H04W 52/14* (2009.01)
  *H04W 84/04* (2009.01)
  *H04W 88/08* (2009.01)
  *H04W 72/04* (2009.01)
  *H04W 72/08* (2009.01)

(52) U.S. Cl.
  CPC ......... *H04W72/0473* (2013.01); *H04W 72/082* (2013.01); *H04W 52/346* (2013.01)

(56) References Cited

U.S. PATENT DOCUMENTS

| | | | |
|---|---|---|---|
| 2011/0211512 A1* | 9/2011 | Kimura et al. | 370/311 |
| 2012/0094682 A1* | 4/2012 | Ode et al. | 455/452.1 |
| 2012/0213128 A1* | 8/2012 | Miyata | 370/277 |

OTHER PUBLICATIONS

ETRI, HeNB over-the-air interference coordination, R1-100463, 3GPP, Jan. 22, 2010.
CATT, Considerations on Interference. Coordination in Het-Nei, R1-100902, 3GPP, Feb. 26, 2010.
ETRI, HeNB over-the-air interference coordination, R1-101396, 3GPP, Feb. 26, 2010.

* cited by examiner

INTERFERENCE INFORMATION FROM CELL #1

| USER | RECEPTION POWER FROM CELL #1 |
|------|------------------------------|
| A    | Ra                           |
| B    | Rb                           |

BASE STATION DEVICE

TECHNICAL FIELD

The present invention relates to base station devices.

BACKGROUND ART

In a wireless communication system that includes a plurality of base station devices, when communication areas (cells) set by the respective plurality of base station devices overlap each other, a signal transmitted by a base station device may arrive at a terminal device in a cell of neighboring another base station device, resulting in an interference signal for the terminal device.

It is well known that such interference can be suppressed by beam forming. That is, a base station device performs beam forming such that a beam is directed to a terminal device existing its own cell (also referred to as own terminal device, hereinafter) while a null beam is directed to a terminal device existing in a cell of another base station device (also referred to as another terminal device, hereinafter). Thereby, a signal (interference signal) from the base station device is less likely to arrive at the another terminal device, and thus interference is suppressed (refer to Non-Patent Literature 1 for beam forming).

CITATION LIST

Non Patent Literature

[NPL 1] "Adaptive Signal Processing Using Array Antenna", written by Nobuyoshi KIKUMA, published by Kagaku Gijyutsu Shuppan, Nov. 25, 1998.

SUMMARY OF THE INVENTION

Problems to be Solved by the Invention

As base station devices in the above wireless communication system, there are, for example, a macro base station device that forms a cell (macro cell) having a size of several kilometers, and a femto base station device that is set in the macro cell and that forms a relatively small cell (femto cell) having a size of about several ten meters in the macro cell.

In the wireless communication system, a femto cell formed by a femto base station device may be in a macro cell, and thus, substantially the entire area of the femto cell may overlap the macro cell. Further, a femto base station device may be set by a user in any place in a macro cell.

Accordingly, a downlink signal of the femto base station device may cause interference in a terminal device connected to the macro base station device, and an uplink signal transmitted by a terminal device connected to the femto base station device may cause interference in the macro base station device.

Further, a plurality of neighboring femto base station devices respectively forming femto cells and terminal devices connected thereto may cause interference to each other.

Since there are various conceivable cases where interference may occur as described above, even if base station devices use the above beam forming scheme, it may be difficult to appropriately suppress such interference in such various cases described above.

In order to suppress such occurring-interference, when there is a possibility for a femto base station device to cause interfere in other devices, it is conceivable, by avoiding using a frequency used in an uplink or downlink signal of another base station device (a macro base station device, in particular), to make the power at the frequency zero, or to reduce, even when using the frequency, the transmission power at that frequency.

By suppressing power distribution at a frequency that may cause interference in another cell, a transmission signal from the own cell is less likely to become an interference signal in another cell, whereby occurring-interference can be suppressed.

That is, when suppressing occurring-interference from a femto cell to a macro cell, as shown in FIGS. 11(a) and 11(b), among all the communication frequency bands in the femto cell, the transmission power in a frequency band f1 used in the macro cell may be suppressed at a small value.

However, the frequency band $f_1$ used in the macro cell is not always constant. As shown in FIG. 11(c), transmission power distribution in the frequency domain may be switched because the frequency band $f_1$ is changed to another frequency band $f_2$ due to a change in the radio wave condition in the macro cell and use of the frequency band f1 becoming inappropriate, or the like.

As in the case of FIG. 11(c), when the transmission power distribution in the macro cell is switched, if the transmission power distribution in the femto cell is still the same as before as shown in FIG. 11(d), interference occurs between the macro cell and the femto cell. That is, since the macro cell and the femto cell use the frequencies overlapping each other, a transmission signal from one of these cells becomes an interference signal for the other cell.

As described above, even if the power distribution, in a cell, at the frequency that may cause interference in another cell is suppressed to a small value, unless the transmission power distribution in the cell does not change in accordance to the switching of the transmission power distribution in the another cell, interference may occur at the time of the switching.

Therefore, an object of the present invention is to provide a base station device that can switch its own transmission power distribution in accordance with a transmission power distribution switching timing of another base station device.

Solution to the Problems (1) The present invention is directed to a base station device including: a control unit that controls transmission power distribution in a frequency domain; and a detection unit that detects a switching timing at which another base station device switches transmission power distribution, wherein at the switching timing or a timing near the switching timing, the control unit changes the transmission power distribution for the base station device.

According to the present invention described above, the base station device can change, at the switching timing of transmission power distribution in another base station device or a timing near the switching timing, transmission power distribution of the base station device.

(2) The detection unit can detect the switching timing, by obtaining information indicating the switching timing from the another base station device via an inter-base-station communication interface. In this case, detection of a switching timing becomes easy.

(3) Preferably, the base station device includes: an obtainment unit that obtains power suppression information, wherein the power suppression information is information indicating a frequency at which a transmission power value should be suppressed, after the switching timing, in a cell of the base station device, and the control unit changes, at the switching timing or the timing near the switching timing, the transmission power distribution for the base station device based on the power suppression information.

(4) Preferably, the control unit once reduces, at the switching timing or the timing near the switching timing, a transmission power in a part or the whole of a frequency domain, and then changes the transmission power distribution for the base station device to new transmission power distribution to be used after the switching timing in the cell of the base station device.

(5) Preferably, the detection unit obtains, via the inter-base-station communication interface, power distribution information of the transmission power distribution in the another base station device, and detects the switching timing based on a cycle of power distribution switching indicated by the power distribution information. In this case, it is possible to detect a switching timing based on power distribution information transmitted from another base station device.

(6) Preferably, the detection unit obtains, via the inter-base-station communication interface, information indicating a cycle of transmission power distribution switching performed in the another base station device, and detects the switching timing based on the switching cycle.

(7) Preferably, based on an observation value of a change in power strength distribution for a communication signal from the another base station device, the detection unit determines a cycle of the change in the power strength distribution, and detects the switching timing. In this case, it is possible to detect a switching timing by observing a communication signal from another base station device.

(8) The detection unit obtains, via the inter-base-station communication interface, information indicating a cycle of a change in power strength distribution for a communication signal in the another base station device, and detects the switching timing based on the cycle.

(9) Preferably, the control unit once reduces, at the switching timing or the timing near the switching timing, a transmission power in a part or the whole of a frequency domain, and then changes the transmission power distribution for the base station device to new transmission power distribution to be used after the switching timing in the cell of the base station device. In this case, even when switching to new power distribution cannot be performed at the time point of the detected switching timing, interference can be prevented.

Note that it is advantageous to use such control not only in a case where new power distribution cannot be determined at the time point of the detected switching timing, but also in a case where the accuracy of the detected switching timing is low.

(10) Preferably, the base station device includes an obtainment unit that obtains power suppression information, wherein the power suppression information is information indicating a frequency at which a transmission power value should be suppressed, after the switching timing, in a cell of the base station device, and the control unit changes, at the switching timing or the timing near the switching timing, the transmission power distribution for the base station device based on the power suppression information. In this case, it is possible to change transmission power distribution after the switching, based on power suppression information.

(11) Preferably, the obtainment unit obtains the power suppression information from the another base station device via the inter-base-station communication interface. In this case, it is possible to easily obtain power suppression information.

(12) The present invention in another aspect is directed to a base station device including: a control unit that controls transmission power distribution in a frequency domain; and a notification unit that notifies another base station device of a switching timing at which the control unit switches the transmission power distribution. In this case, it is possible to notify another base station device of a switching timing of transmission power distribution.

(13) Preferably, the notification unit notifies, via an inter-base-station communication interface, the another base station device of the switching timing. In this case, it is possible to easily perform the notification.

(14) The present invention in another aspect is directed to a method for transmitting information from a first base station device to a second base station device, wherein the first base station device transmits, to the second base station device via an inter-base-station interface, information indicating a timing at which the first base station device switches transmission power distribution in a frequency domain.

(15) The present invention in another aspect is directed to a method for transmitting information from a first base station device to a second base station device, wherein the first base station device transmits, to the second base station device via an inter-base-station interface, information indicating a cycle of transmission power distribution switching in a frequency domain performed in the first base station device.

(16) The present invention in another aspect is directed to a method for transmitting information from a first base station device to a second base station device, wherein the first base station device transmits, to the second base station device via an inter-base-station interface, information indicating a cycle of a change in power strength distribution for a communication signal in the first base station device.

Advantageous Effects of the Invention

According to the present invention, a base station device can switch its own transmission power distribution, in accordance with a transmission power distribution switching timing of another base station device.

DESCRIPTION OF EMBODIMENTS

Hereinafter, preferred embodiments of the present invention will be described with reference to the drawings.

Figure 1:
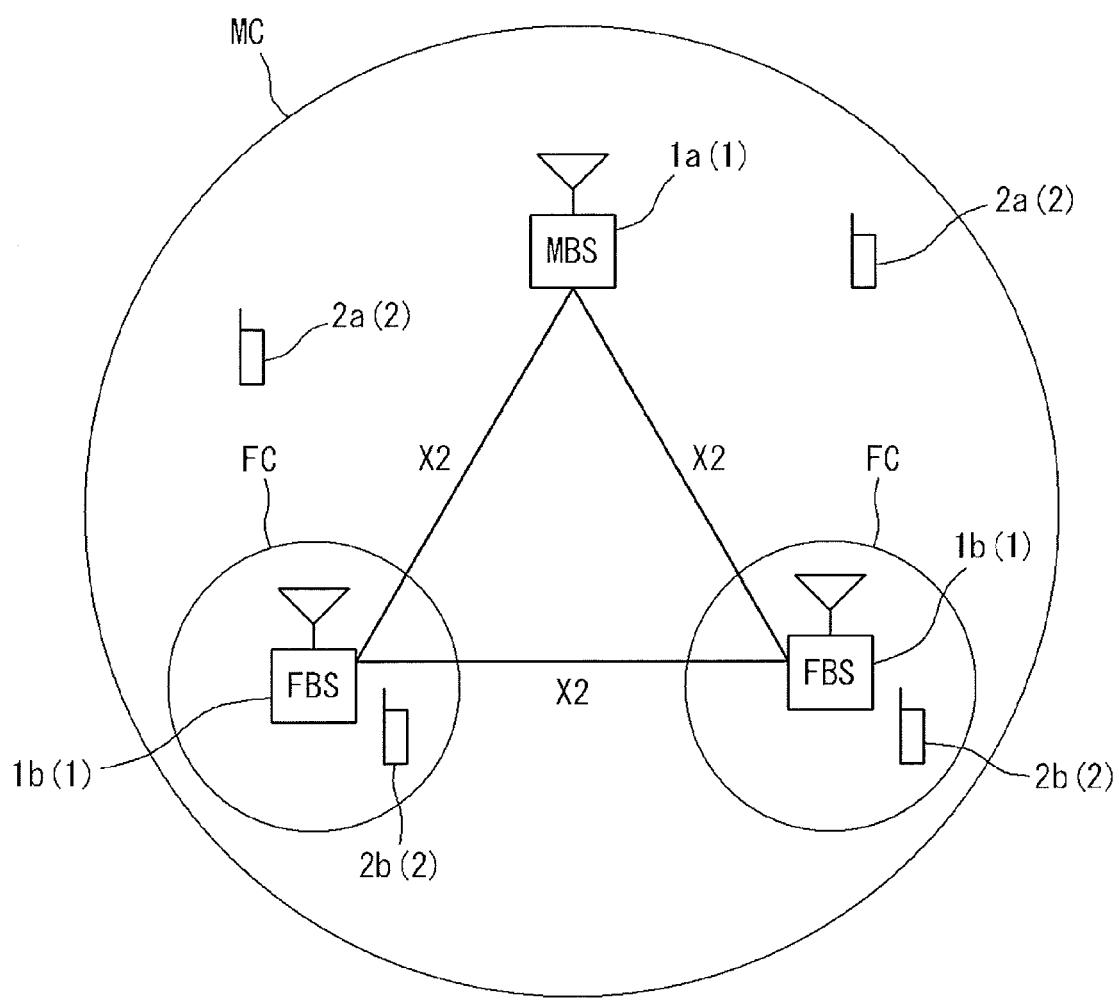
FIG. 1 is a schematic diagram showing a configuration of a wireless communication system including a base station device according to an embodiment of the present invention.

FIG. 1 illustrates a configuration of a wireless communication system including a base station device according to an embodiment of the present invention. The wireless communication system of the present embodiment is, for example, a system for mobile phones to which the LTE (Long Term Evolution) is applied, and communication based on the LTE is performed between each base station device and each terminal device. However, the communication scheme is not limited to the LTE.

The wireless communication system includes a plurality of base station devices 1. A terminal device 2 (mobile terminal: mobile station) is allowed to wirelessly access any of the base station device 1, and communicate with the base station device 1.

The base station device 1 provided in the wireless communication system include: a macro base station device (macro base station) 1a forming a communication area (macro cell) MC having a size of for example, several kilometers; and a plurality of femto base station devices (femto base station) 1b each being installed in the macro cell MC or the like, and forming a relatively small femto cell FC having a size of several tens of meters.

The macro base station device (first base station device: hereinafter also referred to as "macro BS") 1a is allowed to perform wireless communication with a terminal device 2 existing in its own macro cell MC.

On the other hand, each femto base station device (second base station device: hereinafter also referred to as "femto BS") 1b is installed in a place where it is difficult for the terminal device to receive a radio wave from the macro BS 1a, such as indoors, and forms a femto cell FC.

The femto BS 1b is allowed to perform wireless communication with a terminal device (hereinafter also referred to as "MS") existing in its own femto cell FC. In this system, the femto BS 1b that forms a relatively small femto cell FC is installed in a place where it is difficult for the MS 2 to receive a radio wave from the macro BS 1a, and thereby it is possible to provide the MS 2 with services at sufficient throughput.

A plurality of base station devices 1a, 1b, and 1b are allowed to exchange information through an inter-base-station communication interface called an X2 interface. This inter-base-station communication interface is implemented as a wired network, and is used for exchanging necessary information between the base station devices.

In the LTE, frequency division duplex (FDD) is adopted, and uplink communication and downlink communication can be simultaneously performed by allocating different operating frequencies to an uplink signal (a transmission signal from a terminal device to a base station device) and a downlink signal (a transmission signal from a base station device to a terminal device), respectively.

Since even a plurality of different cells may use the same frequency for communication, inter-cell interference may occur between a plurality of cells (particularly between a macro cell MC and a femto cell FC). The inter-cell interference means that a transmission signal from a base station device becomes an interference signal for a terminal device connected to another base station device, or that a transmission signal from a terminal device connected to a base station device becomes an interference signal for another base station device.

Such inter-cell interference is more likely to occur when a femto BS 1b that forms a relatively small femto cell FC having a size of several tens of meters is installed in a relatively large macro cell MC. This is because the macro cell MC and the femto cell FC overlap each other, and a signal from the macro cell MC (femto cell FC) easily reaches the femto cell FC (macro cell MC).

In order to suppress such inter-cell interference, the base station device 1 of the present embodiment performs control such that a frequency that is not used in another cell is used in the own cell, or that the magnitude of power (transmission power) of a signal transmitted from a base station device or a terminal device in the own cell is limited so as to make the signal less likely to reach another cell.

Figure 2:
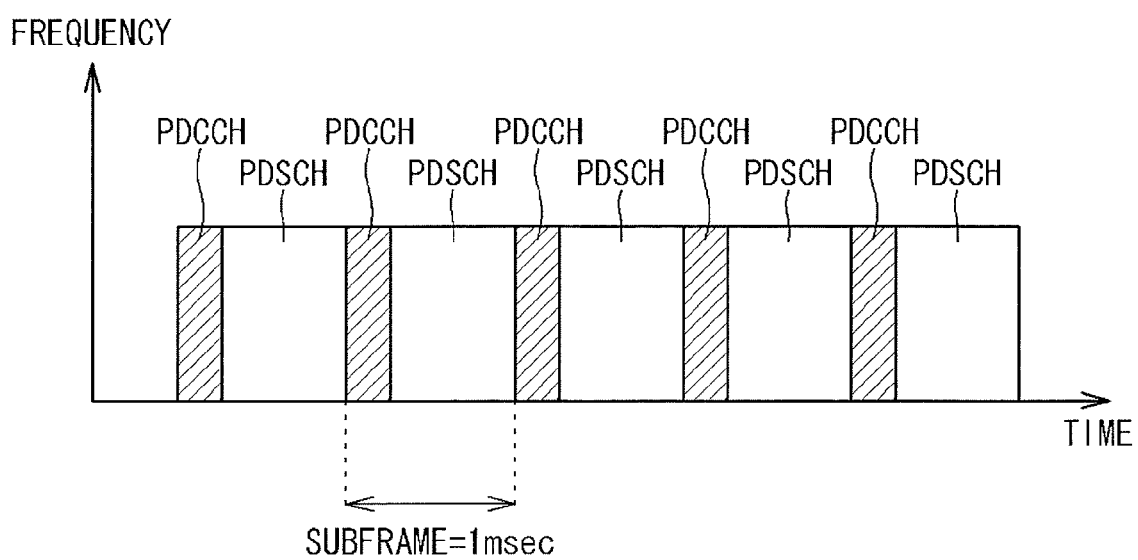
FIG. 2 is a schematic diagram showing a configuration of an LTE DL frame.

FIG. 2 is a schematic structure of a downlink radio frame (DL frame) based on the LTE. A DL frame is composed of 10 subframes arranged in the time-axis direction (Note that FIG. 2 illustrates a part of a DL frame.) A subframe has a length corresponding to 14 OFDM symbols (=1 msec) in the time-axis direction, and has a frequency width of 10 MHz.

Each subframe has, at its beginning, a control area in which control information is stored, and the control area is followed by a PDSCH (physical downlink shared channel) in which user data is stored.

In the control area, a downlink control channel (PDCCH=physical downlink control channel) including downlink and uplink allocation information and the like is secured. The PDCCH includes, in addition to the allocation information, information of an uplink transmission power limit value, and information relating to an instruction to report a downlink CQI (Channel Quality Indicator). The size of the PDCCH varies depending on the size of the control information.

In addition to the PDCCH, the following channels are allocated in the control area: a physical control format indicator channel (PCFICH) for notifying information relating to the PDCCH; and a physical hybrid-ARQ indicator channel (PHICH) for transmitting an acknowledgement (ACK) or a negative acknowledgement (NACK) in response to a hybrid automatic repeat request (HARM) to a PUSCH.

The PDSCH in which user data and the like are stored is an area shared by a plurality of terminal devices, and control information and the like for each terminal device is also stored in the PDSCH in addition to the user data.

The PDSCH is configured to have a plurality of resource blocks (RB). Each resource block is a fundamental unit area (a minimum unit for radio resource allocation) for data transmission. Each resource block has a size corresponding to 12 subcarriers in the frequency-axis direction and 7 OFDM symbols in the time-axis direction.

When the frequency band width of the DL frame is set at 10 MHz, 600 subcarriers are arrayed. Accordingly, in a subframe, 25 resource blocks are arranged in the frequency-axis direction, and the number of resource blocks in the time-axis direction in a subframe is 2.

The base station device 1 has a function for determining allocation of resource blocks as radio resources to terminal devices, and determining a transmission power value for each resource block (details will be described later). Further, like the DL frame, an uplink radio frame (UL frame) based on the LTE has a plurality of resource blocks, and allocation of the resource blocks of the DL frame to terminal devices is also determined by the base station device 1.

The downlink and uplink resource block allocation determined by the base station device 1 is stored in the PDCCH as allocation information, and the allocation information is transmitted from the base station device 1 to a terminal device 2. The base station device 1 and the terminal device 2 perform communication by using the resource blocks, in accordance with the determined allocation information.

Figure 3:
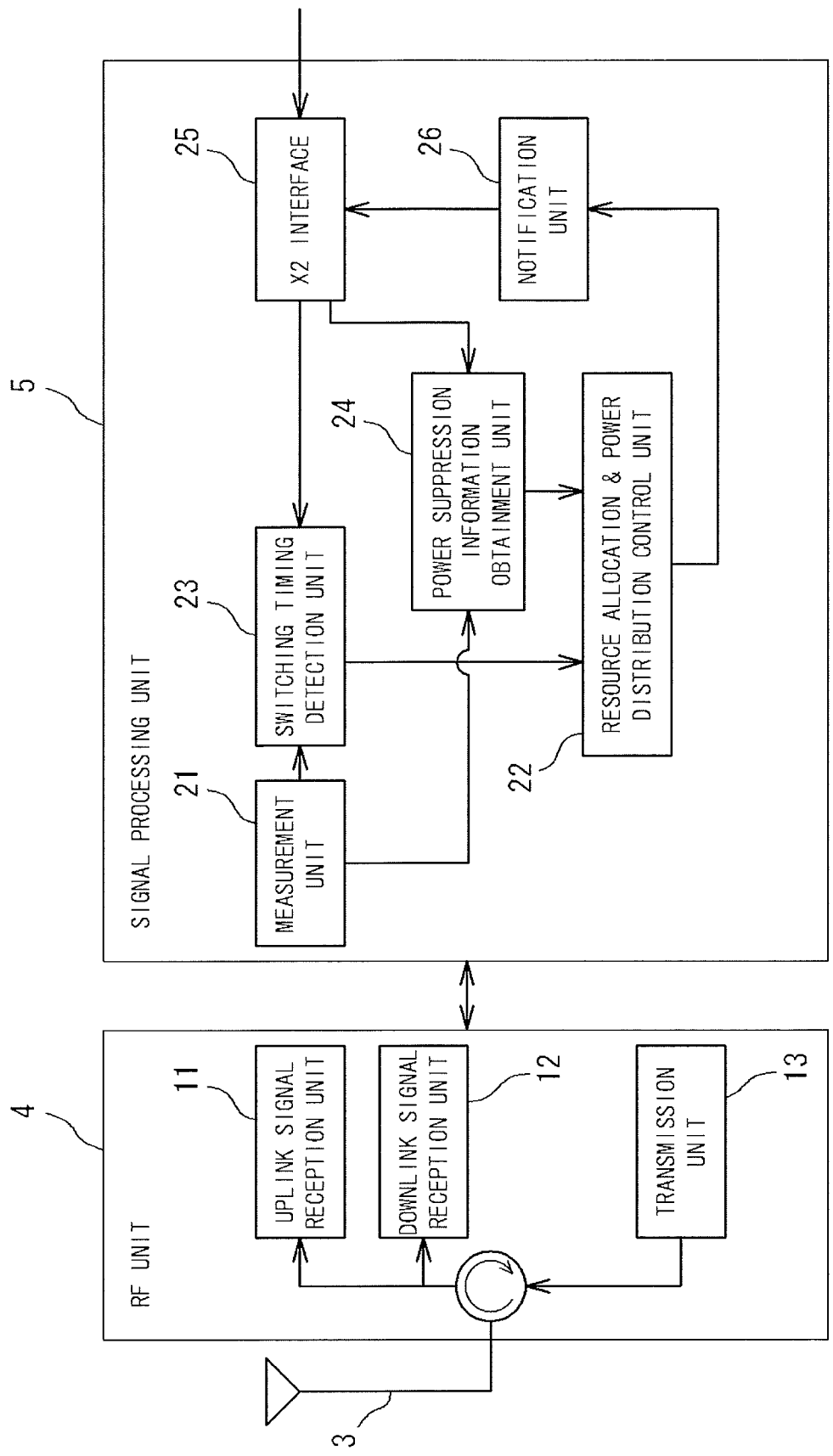
FIG. 3 is a block diagram of a base station device.

FIG. 3 illustrates a configuration of the base station device 1. The configuration of the base station device is preferable for a femto BS 1b. However, in the present embodiment, it is assumed that a macro BS 1a also has a similar configuration to this.

A femto BS 1b includes: an antenna 3; a transmission/reception unit (RF unit) 4 to which the antenna 3 is connected; and a signal processing unit 5 that performs, in addition to signal processing of a transmission/reception signal transmitted to and received from the RF unit 4, processing and the like for suppressing interference that may be caused in another cell (a base station device or a terminal device in another cell).

The RF unit 4 includes an uplink signal reception unit 11, a downlink signal reception unit 12, and a transmission unit 13. The uplink signal reception unit 11 receives an uplink signal from an MS 2 and the downlink signal reception unit 12 receives a downlink signal from another macro BS 1a or another femto BS 1b. The transmission unit 13 transmits a downlink signal to an MS 2.

In the present embodiment, the downlink signal reception unit 12 is used to sniff a downlink signal from another base station device 1, and is used to observe (measure) the downlink signal. A downlink reception signal outputted from the downlink signal reception unit 12 is provided to the signal processing unit 5, and is processed by a measurement unit 21 or a demodulation unit not shown.

The signal processing unit 5 includes a resource allocation & power distribution control unit 22. The control unit 22 performs, with respect to each of the uplink and downlink subframes, resource block allocation (frequency allocation) for each terminal device. The control unit 22 has a function of setting, for each resource block, a transmission power of a downlink transmission signal of the own base station device 1 and a transmission power of an uplink transmission signal of a terminal device 2 connected to the own base station device 1.

The control unit 22 adjusts allocation of resource blocks and adjusts the transmission power of the own base station device 1 and/or the transmission power of a terminal device that communicates with the base own station device 1, and thereby suppresses occurring-interference from occurring in a base station device or a terminal device in another cell.

That is, with respect to a frequency domain (resource block) that may cause interference in another cell, the control unit 22 performs control such that the own base station device 1 does not use the frequency domain in its own cell, or such that the transmission power in the own base station device 1 or in a terminal device in its own cell is suppressed. Accordingly, a signal transmitted by the own base station device 1 or a terminal device in its own cell is prevented from becoming an interference signal in another cell.

The control unit 22 performs control so as not to make transmission power distribution different for each subframe, but to maintain the same transmission power distribution for a predetermined period (a length corresponding to a plurality of successive subframes: for example, 100 msec). Moreover, the control unit 22 reviews, at a predetermined timing, the transmission power distribution (resource block allocation and transmission power for each resource block), and determines new transmission power distribution.

The control unit 22 performs switching from the current transmission power distribution to new transmission power distribution, in accordance with the switching timing of a transmission power distribution switching performed in another base station device 1 (macro BS 1a).

The signal processing device 5 includes a detection unit 23 for detecting a timing of transmission power distribution switching performed in another base station device 1.

The control unit 22 switches the transmission power distribution in the own cell, at a switching timing in another base station device 1 (especially macro BS 1a) detected by the detection unit 23, or at a timing near the switching timing.

Further, the signal processing unit 5 includes a power suppression information obtainment unit 24. The power suppression information obtainment unit 24 obtains power suppression information including information indicating at which frequencies (resource blocks) transmission powers should be suppressed and/or information indicating how much a transmission power should be suppressed for each frequency. The obtained power suppression information is provided to the control unit 22.

The control unit 22 determines, by using the power suppression information and other necessary information (QoS information and CQI information), new power distribution to be used after power distribution switching in its own cell.

The new transmission power distribution to be used after switching in the own cell is determined so as not to cause interference in another cell, by, for example, suppressing a transmission power for a resource block (frequency) being used in the another cell.

In this manner, in accordance with a change in transmission power distribution in another cell, transmission power distribution in the own cell is also switched, so as not to cause interference in communication performed with the new transmission power distribution in the another cell. Accordingly, it is possible to prevent interference from occurring in the another cell immediately after the transmission power distribution is switched in the another cell.

In the present embodiment, the detection unit 22 and the obtainment unit 24 obtain, from another base station device 1 via an X2 interface (inter-base-station communication interface) 25, information necessary for knowing the timing to switch the power distribution in the own base station device 1. Here, as information necessary for knowing the timing to switch the power distribution in the own base station device 1, information indicating a switching timing in the another base station device 1 and power suppression information are obtained, for example.

Note that another base station device 1 (macro BS 1a) is configured to periodically switch the transmission power distribution. The another base station device 1 (macro BS 1a) is configured to transmit, via the X2 interface (inter-base-station communication interface), the information indicating the switching timing and the power suppression information.

In order to generate the power suppression information to be transmitted, the another base station device (macro BS 1a) preferably performs the following processing.

Figure 4:
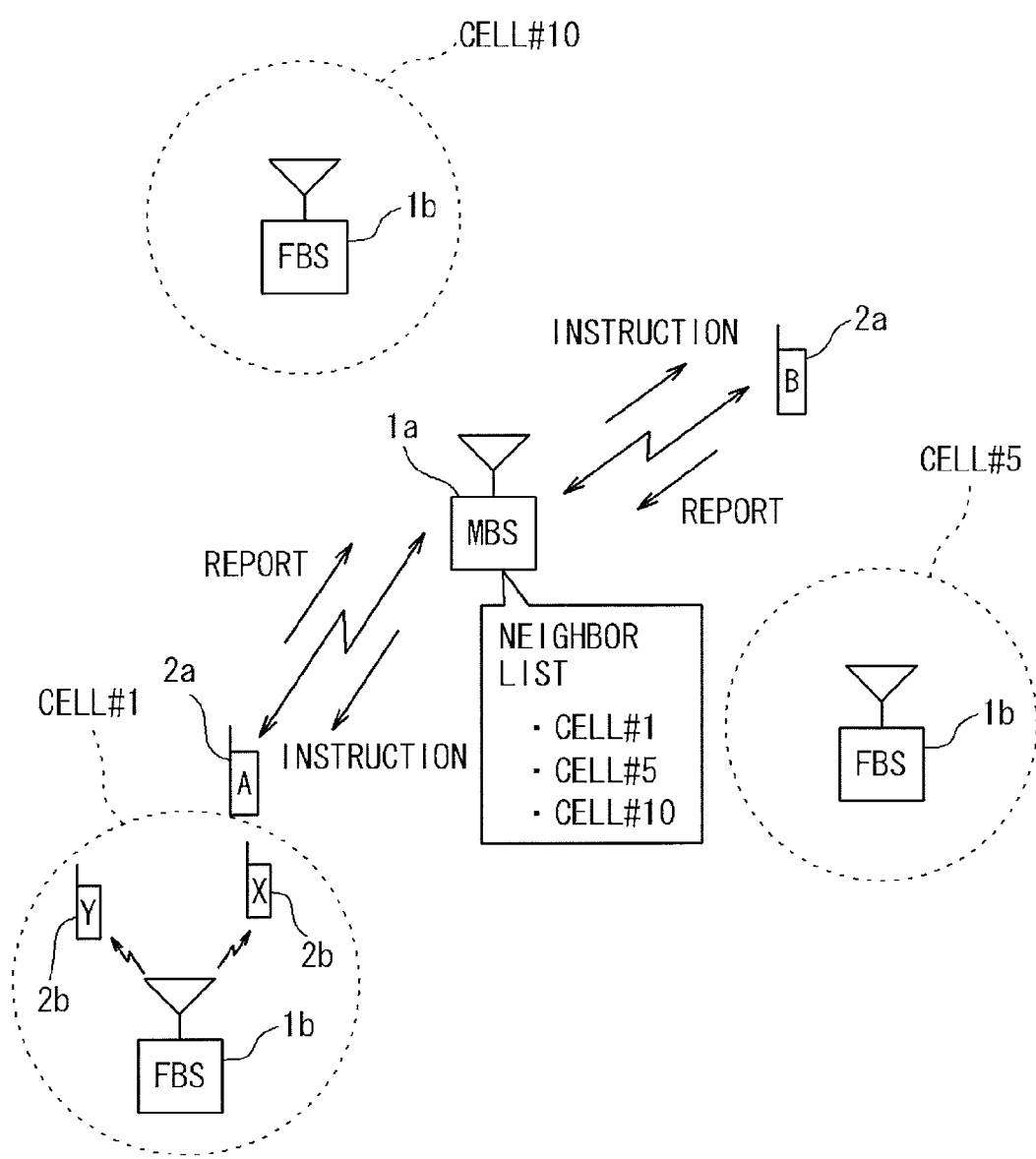
FIG. 4 illustrates a method for measuring interference power.

As shown in FIG. 4, the macro BS 1a transmits, to each of the terminal devices 2a and 2a connected to itself, an instruction to measure the reception power of a signal transmitted from base station devices 1b, 1b, and 1b in respective neighboring cells (cell #1, cell #5, and cell #10) and to report the results to the macro BS 1a.

The instruction includes a neighbor list of the macro BS 1a (a list of neighboring cells (base station devices)). Each of the terminal devices 2a and 2a that has received the instruction attempts to receive a signal from each base station device listed in the neighbor list, and measures the reception power. The reception power measured by the terminal device 2a is reported to the macro BS 1b.

The macro BS 1a treats the reception power of a signal from each cell (base station device) measured by each of the terminal devices 2a and 2b, as interference information (interference power). Here, it is assumed that one of the two macro MSs 2a and 2a connected to the macro BS in FIG. 4 is defined as a user A, and the other is defined as a user B.

Figures 5A, 5B:
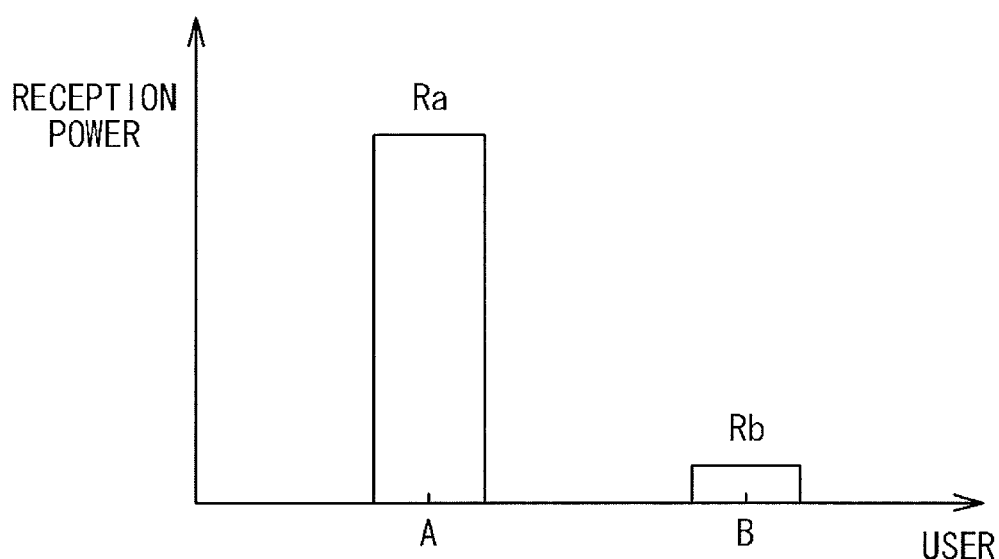
FIG. 5 shows interference information from cell #1.

As shown in FIG. 5(a), the macro BS 1a generates interference information for each cell (base station device). FIG. 5(a) shows interference information representing magnitudes Ra and Rb of interference powers (measured reception powers) that the users A and B (the terminal devices 2b and 2b) received, respectively, from the femto BS 1b forming the cell #1.

As shown in FIG. 5(b), with respect to the user A existing at a position near the cell #1, the reception power magnitude Ra is large, and with respect to the user B existing at a position far from the cell #1, the reception power magnitude Rb is small.

Such a difference between the reception powers is caused mainly by the difference in distances between the users and the base station device 1b forming the cell #1. A small distance causes less signal attenuation (path-loss) in a transmission path and thus a large reception power. On the other hand, a large distance causes more signal attenuation (path-loss) in a transmission path and thus a small reception power.

Therefore, with respect to a frequency used by the user A, if the same frequency is used in the cell #1, interference is likely to occur in the user A. On the other hand, with respect to a frequency used by the user B, even if the same frequency is used in the cell #1, interference is less likely to occur in the user B.

Therefore, the femto BS 1b need not avoid using all frequencies (resource blocks) used by the macro BS 1a or suppressing the transmission powers. That is, with respect to the frequency (resource block) used by the user B which is less susceptible to interference, even if the femto BS 1b uses the frequency at a relatively large transmission power, interference can be avoided.

Figure 6:
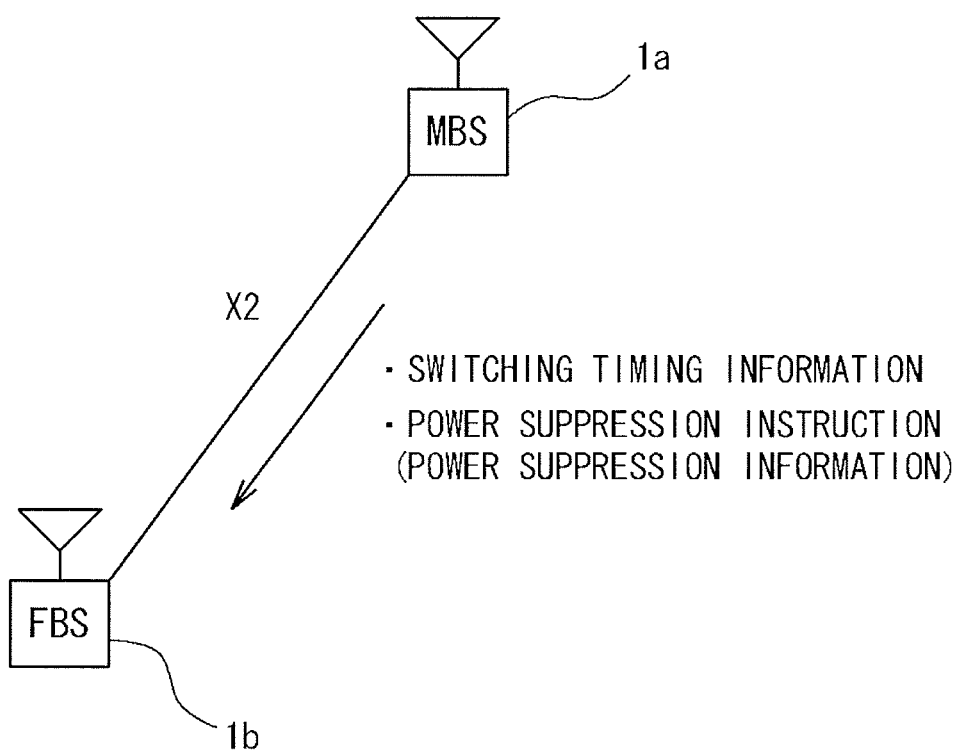
FIG. 6 shows how switching timing information and the like are notified from a macro base station device to a femto base station device.

Meanwhile, as shown in FIG. 6, a notification unit 26 of the macro BS 1a transmits, when transmitting information indicating a next power distribution switching timing of the macro BS 1a, a power suppression instruction as well, to the femto BS 1b forming the cell #1. The power suppression instruction is for suppressing a transmission power at a given frequency in the cell #1, after a power distribution switching timing in the macro BS 1a.

The power suppression instruction includes power suppression information that specifies a frequency at which the transmission power is to be suppressed by the femto BS 1b or a femto MS 2b. The frequency indicated by the power suppression information may be all frequencies used by the macro BS 1a after a power distribution switching timing in the macro BS 1a, but may be only frequencies that are susceptible to interference in the macro cell. That is, in the state shown in FIG. 4, only frequencies used by the user A that are susceptible to interference may be set as the frequencies at which the transmission power is to be suppressed. In this case, the number of radio resources that can be used in the cell #1 is increased, which is advantageous.

Moreover, the power suppression information includes information (for example, an upper limit value for a transmission power) indicating how much the transmission power should be suppressed at a frequency at which the transmission power is to be suppressed. The larger the reception power shown in FIG. 5 is, the more interference is likely to occur. Thus, the larger the reception power shown in FIG. 5 is, the smaller the transmission power from the cell #1 should be.

Thus, in accordance with the reception power shown in FIG. 5, the macro BS 1a determines a transmission power suppression value (an upper limit value for a transmission power) for the frequency used by the user A, and transmits the transmission power suppression value included in the power suppression information.

Figure 7:
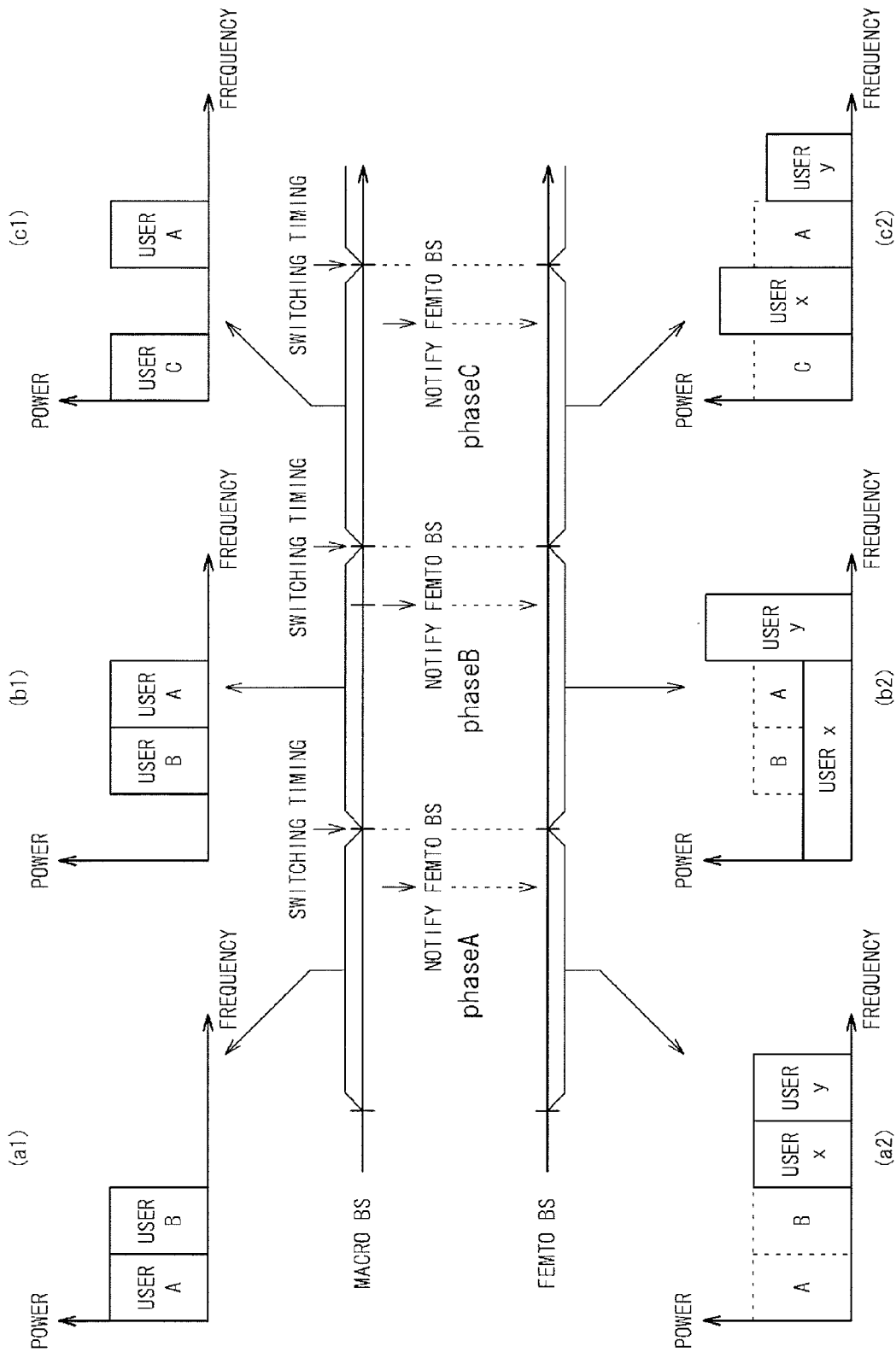
FIG. 7 shows how power distribution switching is performed in a femto base station device, in synchronization with a macro base station device.

FIG. 7 shows how power distribution switching is performed in a femto BS 1b which is notified of information such as a switching timing, from the macro BS 1a as described above.

First, it is assumed that, at a time point (phase A), the macro BS 1a is using frequency domains shown in FIG. 7(a1) for the user A and the user B, respectively. At this time, as shown in FIG. 7(a2), the femto BS 1b is using frequency domains not used by the macro BS 1b, for terminal devices 2b and 2b (users x and y) in its own cell FC, and interference between the macro cell and the femto cell #1 is avoided.

For convenience, the frequency domains indicated by "A" and "B" in FIG. 7(a2) represent frequency domains used by the user A and the user B in FIG. 7(a1), respectively, and are not frequency domains used by the femto cell #1. The same applies to "A", "B", and "C" in FIGS. 7(b2) and 7(c2).

When the macro BS 1a is going to switch the power distribution in the frequency domain due to a change in radio wave condition in its cell MC or the like, the macro BS 1a notifies the femto BS 1b, before the switching timing, of switching timing information and a power suppression instruction.

Upon receiving the notification of the switching timing information and the power suppression instruction, the femto BS 1b determines frequencies (resource blocks) to be used in its own cell #1 and a transmission power for each frequency (resource block), based on the notified power suppression instruction. Determination of new use frequencies and new transmission powers are performed so as not to cause interference in the macro cell MC.

Then, at the time point of the notified switching timing, the femto BS 1b performs switching to the new use frequencies and the new transmission powers that have been determined. FIGS. 7(b1) and 7(b2) show power distribution states of the macro BS 1a and the femto BS 1b used after the power distribution switching (phase B).

Here, it is assumed that the frequencies indicated by the power suppression information included in the power suppression instruction do not include frequencies used by the user B (see FIG. 7(b1)) and only frequencies used by the user A are included. Accordingly, in the phase B as shown in FIG. 7(b2), the femto BS 1b allocates, for the user y, frequencies not used by the macro BS 1a. Further, for the user x, the femto BS 1b allocates frequencies including the frequencies used by the user A of the macro cell MC, but performs power distribution so as not to cause interference in the macro cell MC by suppressing the transmission power for the user x.

Accordingly, also in the phase B, interference is avoided between the macro cell and the femto cell #1. In addition, since the switching of the power distribution in the macro cell and the switching of the power distribution in the femto cell #1 are performed in synchronization with each other, there is hardly any time period in which interference occurs due to a difference between the switching timings of the power distributions in the cells.

Note that it is preferable that the timings of switching of the power distributions in the macro cell and the femto cell #1 coincide with each other. However, they need not completely coincide with each other and may be shifted from each other. That is, the switching timing in the femto cell #1 may be the switching timing in the macro cell or a timing near the switching timing.

Similarly, also before the next switching timing, the macro BS 1*a* provides a similar notification to the femto BS 1*b*. Accordingly, as shown in FIGS. 7(*c*1) and 7(*c*2), also in phase C after the switching, the macro BS 1*a* and the femto BS 1*b* cooperatively determine power distribution so as not to cause interference in the cells, as in the phase B.

Meanwhile, if the femto BS 1*b* which has received the notification of the switching timing from the macro BS 1*a* obtains, before the switching timing comes, power suppression information to be used after the switching, the femto BS 1*b* can know frequencies at which the power should be suppressed (including frequencies that should not be used), and can determine power distribution that would not cause interference in the macro cell.

However, if the obtainment of the power suppression information is delayed, the femto BS 1*b* cannot perform its switching in accordance with the switching performed in the macro BS 1*a*.

Figure 8:
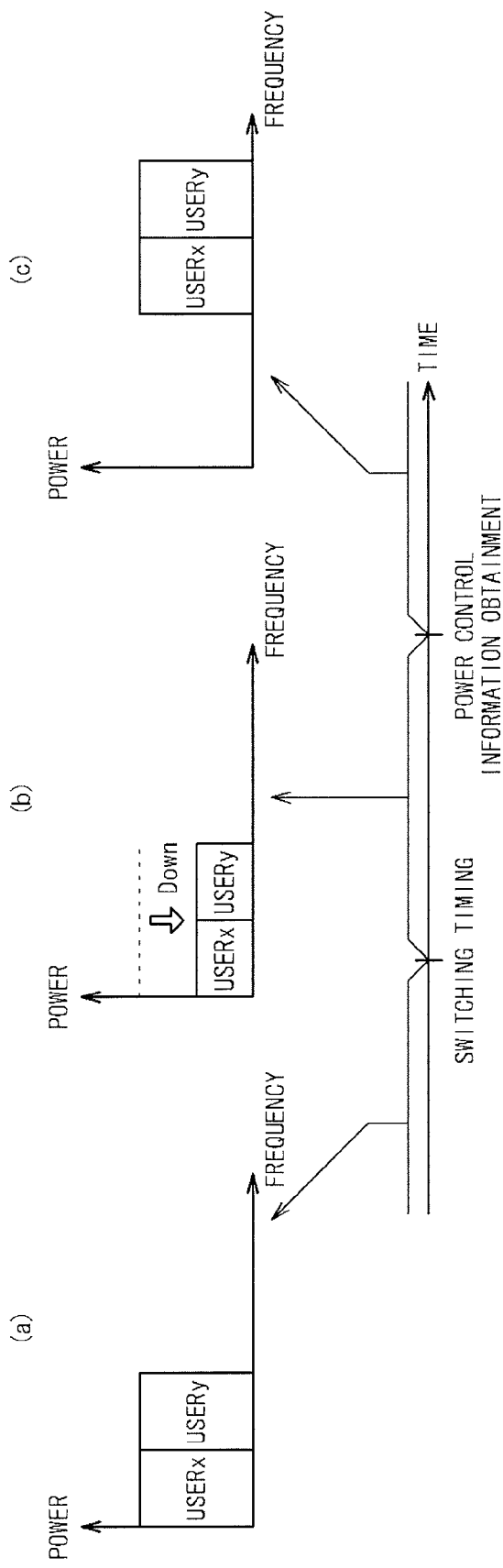
FIG. 8 illustrates a power reduction mode.

FIG. 8 shows a controlling manner appropriate for the case where obtainment of power suppression information may be delayed. It is assumed that, at a time point before the power distribution switching in the macro BS 1*a*, the femto BS 1*b* is performing communication with the power distribution shown in FIG. 8(*a*).

In the state of FIG. 8(*a*), in a case where the detection unit 23 of the femto BS 1*b* has detected a switching timing of the macro BS 1*a* but the power suppression information obtainment unit 24 has not, even after the switching timing has come, obtained power suppression information to be used after the switching, the control unit 22 performs a control to change its power distribution so as to reduce the transmission power over the whole of the communication frequency bands. The state under such control will be referred to as power reduction mode.

In the power reduction mode, communication is performed such that no transmission power value at any frequency exceeds a predetermined relatively-low transmission power value.

Therefore, in the power reduction mode, although throughput is reduced, it is possible to suppress interference from occurring whatever the power distribution state of the macro BS 1*a* after the power distribution switching may be.

Note that in the power reduction mode, the transmission power may be reduced over the whole of the communication frequency bands. However, the transmission power at frequencies obviously not used by the macro BS 1*b* may not be reduced. That is, in the power reduction mode, the transmission power at only some frequencies may be reduced.

After the power reduction mode has been set, and when the power suppression information obtainment unit 24 of the femto BS 1*b* has obtained power suppression information, the control unit 22 determines, based on the power suppression information, new use frequencies and new transmission power distribution, and switches the current distribution to the new power distribution. After the switching, in frequency domains that would not cause interference in the macro BS 1*a*, the transmission power may be increased as compared to that in the power reduction mode, whereby efficient communication can be performed.

By the femto BS 1*b* being set in the power reduction mode at the switching timing of the macro BS 1*a* as shown in FIG. 8, the femto BS 1*b* has a time margin for determining new power distribution, and can perform processing more easily.

Figure 9A:
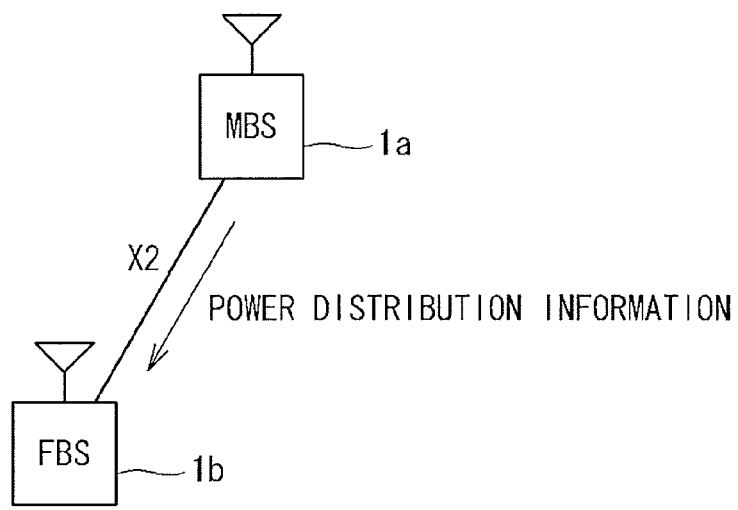
FIG. 9 shows a modification example of a switching timing detection.
Figure 9B:
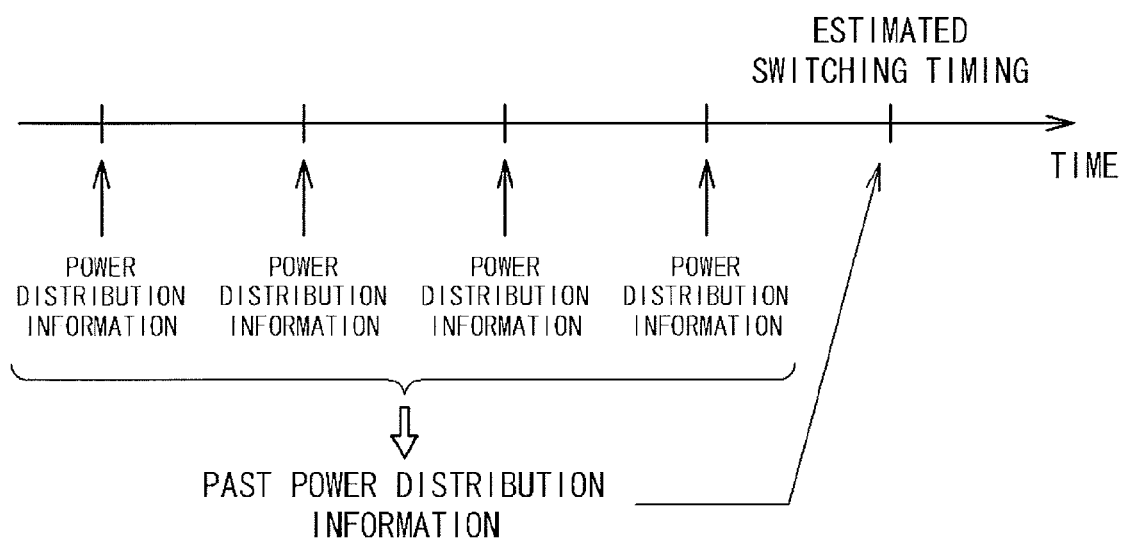

FIG. 9 shows another example of how switching timing detection is performed by the switching timing detection unit 23. With reference to FIG. 9(*a*), power distribution information indicating power distribution in the frequency domain in the macro BS 1*a* is simply transmitted from the macro BS 1*a* to the femto BS 1*b* via the X2 interface. The power distribution information may be frequently transmitted for each subframe, or may be transmitted only at the timing when power distribution is switched.

Upon receiving the power distribution information via the X2 interface 25, the detection unit 23 of the femto BS 1*b* determines, based on past power distribution information as shown in FIG. 9(*b*), a cycle of switching of power distribution that is periodically switched in the macro BS 1*a*. Specifically, an average value of cycles of past power distribution switching is determined, and a time point that is after, by about the obtained average value, a most recent power distribution switching time point is detected as an estimated value of the next switching timing. Note that the femto BS 1*b* may obtain, from the macro BS 1*a* via the X2 interface 25, information indicating a power distribution switching cycle in the macro BS 1*a*, and may estimate, based on the obtained switching cycle, the next switching timing.

When the estimated switching timing indicated by the estimated value has come, the control unit 22 enters a power reduction mode as shown in FIG. 8(*b*). Then, upon obtaining power distribution information to be used after the switching, from the macro BS 1*b*, the power suppression information obtainment unit 23 generates power suppression information indicating that the power at frequencies used by the macro BS 1*a* should be suppressed, and notifies the control unit 22 of it.

Accordingly, the control unit 22 can determine new power distribution in accordance with the power suppression information.

Figure 10A:
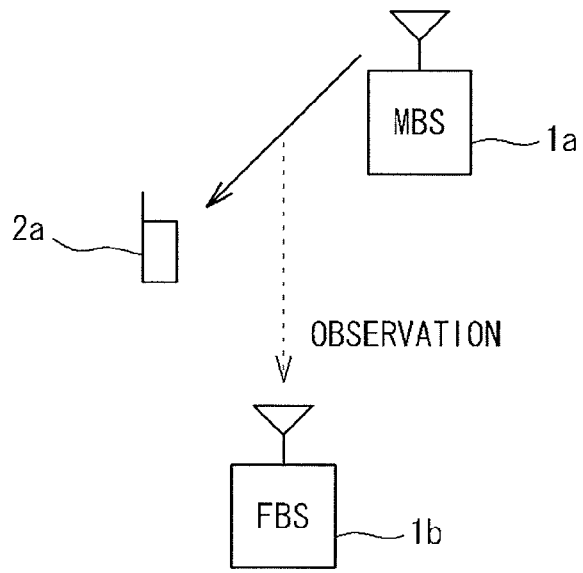
FIG. 10 shows a modification example of a switching timing detection.
Figure 10B:
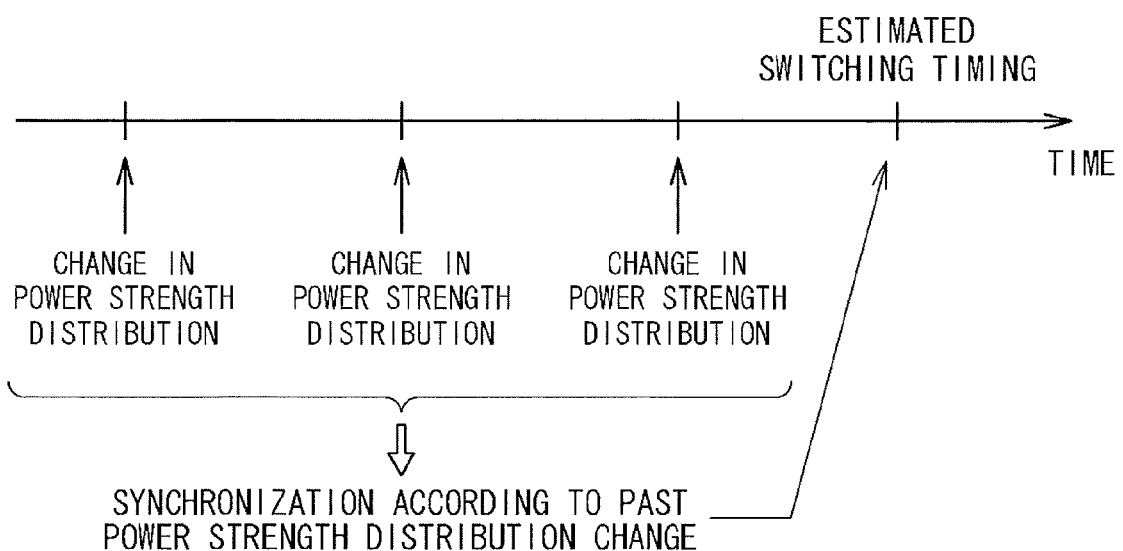
Figure 11:
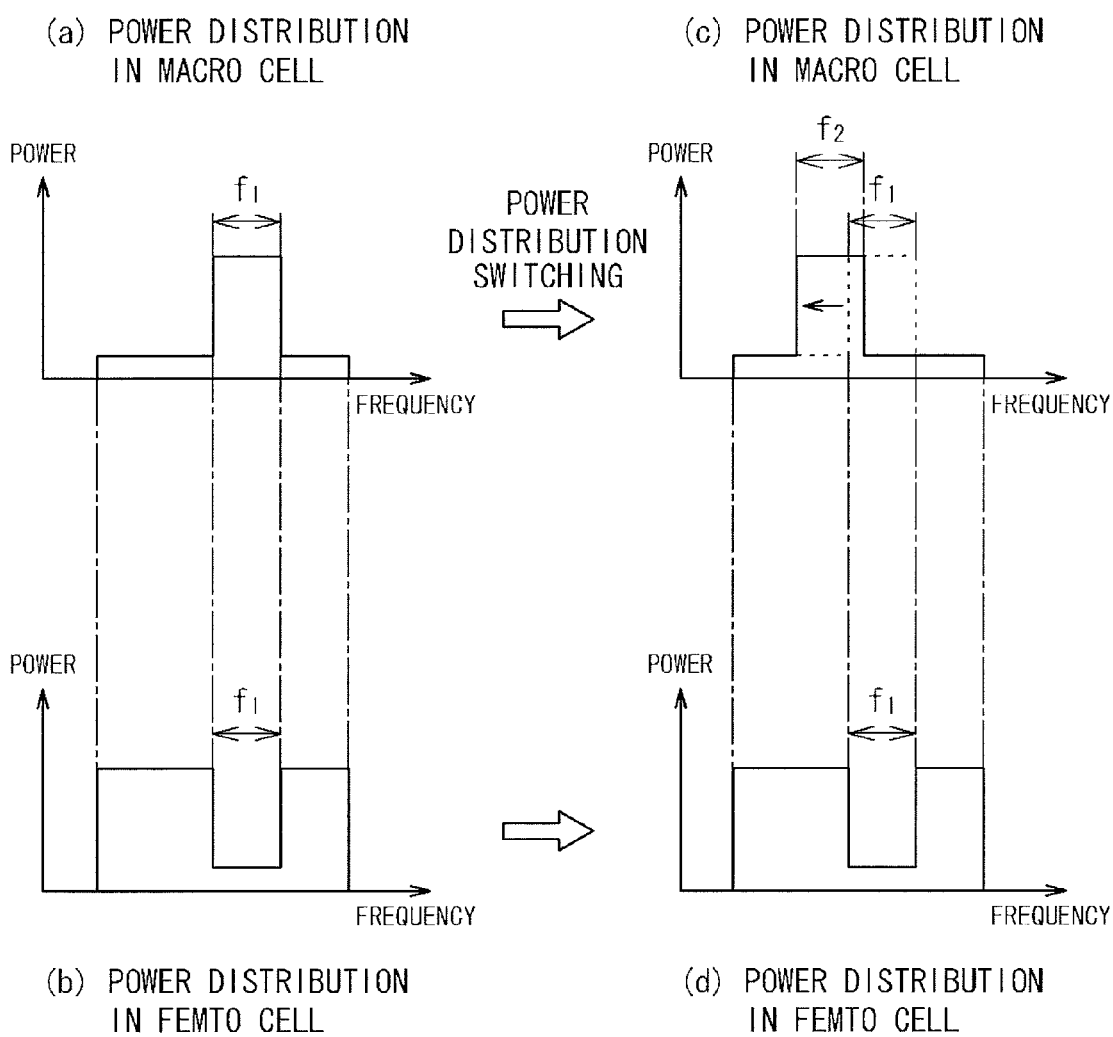
FIG. 11 illustrates a problem associated with power distribution switching.

FIG. 10 shows another example of how a switching timing detection is performed by the switching timing detection unit 23. With reference to FIG. 10(*a*), the femto BS 1*b* observes a communication signal exchanged between the macro BS 1*a* and a macro MS 1*b*, and understands power strength distribution in the frequency domain in the macro cell.

This observation is performed by the measurement unit 21, based on a reception signal, which is an uplink signal and/or a downlink signal in the macro cell and are/is received by the reception unit 11 and/or 12, respectively.

An observation value indicating power strength distribution for each frequency is provided to the detection unit 23. The detection unit 23 extracts timings at which the power strength distribution changes (power distribution switching timings in the macro BS 1*a*), and accumulates them. Moreover, based on the timings of the accumulated power strength distribution changes, the detection unit 23 determines the cycle of the change. Specifically, an average value of past cycles is determined, and a point of time that is after, by about the average value, a most recent time point at which power strength distribution changed, is detected as an estimated value of the next switching timing.

Note that the femto BS 1*b* may obtain, from the macro BS 1*a* via the X2 interface 25, information indicating the cycle of power strength distribution change in the macro BS 1*a*, and may estimate the next switching timing, based on the obtained cycle.

When the estimated switching timing indicated by the estimated value has come, the control unit 22 enters a power reduction mode as shown in FIG. 8(*b*). Then, upon obtaining, via the measurement unit 21, power strength distribution to be used after the switching in the macro cell, the power suppression information obtainment unit 23 generates power suppress information indicating that the power at the frequencies used by the macro BS 1*a* should be suppressed, and notifies the control unit 22 of it.

Accordingly, the control unit 22 can determine new power distribution in accordance with the power suppression information.

Note that the embodiments disclosed in the present invention are to be considered in all respects as illustrative and not restrictive. The scope of the invention is not limited to the foregoing meaning but defined by the claims, and all changes which come within the meaning and range of equivalency of the claims are therefore intended to be embraced therein.

For example, in the above embodiments, suppression of interference between a macro BS and a femto BS has been described. However, interference between femto BSs may be suppressed. Further, switching timing information or the like may be notified from a femto BS to a macro BS.

Further, the switching timing detection method shown in FIG. 9 and the switching timing detection method shown in FIG. 10 may be used in combination.

DESCRIPTION OF THE REFERENCE CHARACTERS 1 base station device
1a macro base station device
1b femto base station device
2a macro terminal device
2b femto terminal device
21 measurement unit
22 control unit
23 detection unit
24 power suppression information obtainment unit

The invention claimed is:

1. A base station device comprising:
a control unit that controls transmission power distribution in a frequency domain; and
a detection unit that detects a switching timing at which another base station device switches transmission power distribution, wherein
the detection unit detects a cycle of transmission power distribution switching periodically performed in the another base station device, and detects the switching timing based on the switching cycle, and
at the switching timing or a timing near the switching timing, the control unit changes the transmission power distribution for the base station device.

2. The base station device according to claim 1, wherein
the detection unit detects the switching timing, by obtaining information indicating the switching timing from the another base station device via an inter-base-station communication interface.

3. The base station device according to claim 2, comprising:
an obtainment unit that obtains power suppression information, wherein
the power suppression information is information indicating a frequency at which a transmission power value should be suppressed, after the switching timing, in a cell of the base station device, and
the control unit changes, at the switching timing or the timing near the switching timing, the transmission power distribution for the base station device based on the power suppression information.

4. The base station device according to claim 3, wherein
the control unit once reduces, at the switching timing or the timing near the switching timing, a transmission power in a part or the whole of a frequency domain, and then changes the transmission power distribution for the base station device to new transmission power distribution to be used after the switching timing in the cell of the base station device.

5. A base station device comprising:
a control unit that controls transmission power distribution in a frequency domain; and
a detection unit that detects a switching timing at which another base station device switches transmission power distribution, wherein
at the switching timing or a timing near the switching timing, the control unit changes the transmission power distribution for the base station device, and wherein
the detection unit obtains, via the inter-base-station communication interface, power distribution information of the transmission power distribution in the another base station device, and detects the switching timing based on a cycle of power distribution switching indicated by the power distribution information.

6. A base station device comprising:
a control unit that controls transmission power distribution in a frequency domain; and
a detection unit that detects a switching timing at which another base station device switches transmission power distribution, wherein
at the switching timing or a timing near the switching timing, the control unit changes the transmission power distribution for the base station device, and wherein
the detection unit obtains, via the inter-base-station communication interface, information indicating a cycle of transmission power distribution switching performed in the another base station device, and detects the switching timing based on the switching cycle.

7. A base station device comprising:
a control unit that controls transmission power distribution in a frequency domain; and
a detection unit that detects a switching timing at which another base station device switches transmission power distribution, wherein
at the switching timing or a timing near the switching timing, the control unit changes the transmission power distribution for the base station device, and wherein
based on an observation value of a change in power strength distribution for a communication signal from the another base station device, the detection unit determines a cycle of the change in the power strength distribution, and detects the switching timing.

8. A base station device comprising:
a control unit that controls transmission power distribution in a frequency domain; and
a detection unit that detects a switching timing at which another base station device switches transmission power distribution, wherein
at the switching timing or a timing near the switching timing, the control unit changes the transmission power distribution for the base station device, and wherein
the detection unit obtains, via the inter-base-station communication interface, information indicating a cycle of a change in power strength distribution for a communication signal in the another base station device, and detects the switching timing based on the cycle.

9. A base station device comprising:
a control unit that controls transmission power distribution in a frequency domain; and
a detection unit that detects a switching timing at which another base station device switches transmission power distribution, wherein at the switching timing or a timing near the switching timing, the control unit changes the transmission power distribution for the base station device, and wherein the control unit once reduces, at the switching timing or the timing near the switching timing, a transmission power in a part or the whole of a frequency domain, and then changes the transmission power distribution for the base station device to new transmission power distribution to be used after the switching timing in the cell of the base station device.

10. A base station device comprising:

a control unit that controls transmission power distribution in a frequency domain; and a detection unit that detects a switching timing at which another base station device switches transmission power distribution, wherein at the switching timing or a timing near the switching timing, the control unit changes the transmission power distribution for the base station device, an obtainment unit that obtains power suppression information, wherein the power suppression information is information indicating a frequency at which a transmission power value should be suppressed, after the switching timing, in a cell of the base station device, and the control unit changes, at the switching timing or the timing near the switching timing, the transmission power distribution for the base station device based on the power suppression information.

11. The base station device according to claim 10, wherein the obtainment unit obtains the power suppression information from the another base station device via the inter-base-station communication interface.

12. A base station device comprising:

a control unit that controls transmission power distribution in a frequency domain, the control unit periodically performing transmission power distribution switching; and a notification unit that notifies another base station device of information indicating a cycle of transmission power distribution switching by the control unit.

13. The base station device according to claim 12, wherein the notification unit notifies, via an inter-base-station communication interface, the another base station device of the switching timing.

* * * * *